UNITED STATES PATENT OFFICE.

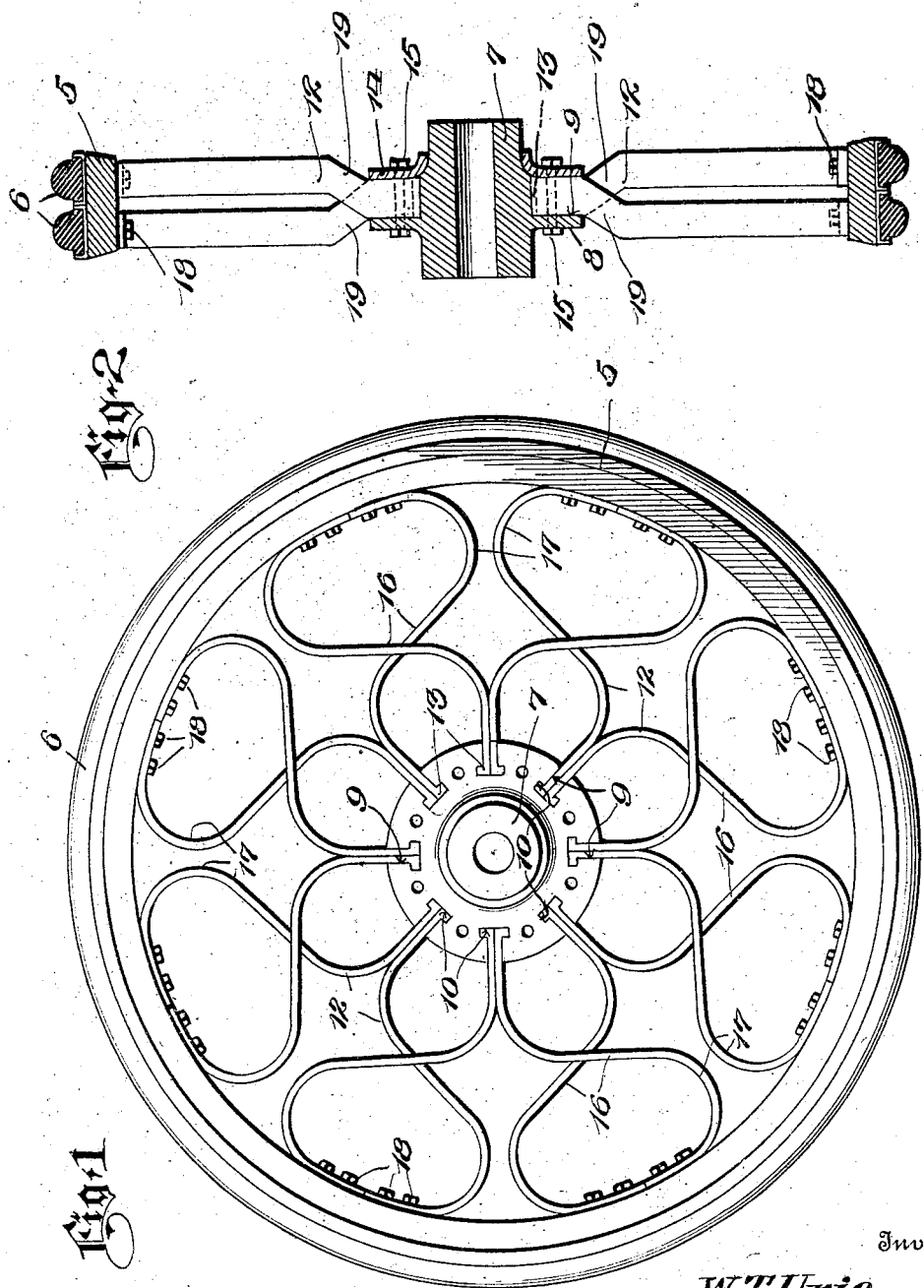

WILLIAM T. URIE, OF INDEPENDENCE, MISSOURI.

SPRING-WHEEL.

1,060,146.

Specification of Letters Patent. Patented Apr. 29, 1913.

Application filed August 19, 1912. Serial No. 715,860.

*To all whom it may concern:*

Be it known that I, WILLIAM T. URIE, a citizen of the United States, residing at Independence, in the county of Jackson and State of Missouri, have invented certain new and useful Improvements in Spring-Wheels, of which the following is a specification, reference being had to the accompanying drawings.
This invention relates to spring wheels and has for its object to provide an improved spring spoke for vehicle wheels whereby a maximum of resiliency and durability in wheels of this character is obtained.
Another and more specific object of the invention resides in the provision of a wheel having spring spokes each consisting of a pair of flat resilient plates arranged in two circular series, the spokes of one series being staggered with relation to those of the other series, said spring plates being so arranged that longitudinal pressure thereon is practically eliminated, while thrust in an axial direction is imparted to the resilient plates against the edges thereof, thereby obviating distortion of said plates.

Still another object of the invention resides in the provision of a spring spoke for vehicle wheels consisting of a pair of resilient plates engaged with each other at one of their ends and adapted to be fixed to the hub of the wheel, said plates extending in opposite directions and provided upon their outer ends with circumferentially extending loops, the outer extremities of the plates bearing against the felly of the wheel.

With the above and other objects in view as will become apparent as the description proceeds, the invention consists in certain constructions, combinations and arrangements of the parts that I shall hereinafter fully describe and claim.

For a full understanding of the invention reference is to be had to the following description and accompanying drawing, in which—

Figure 1 is a side elevation of a wheel provided with my improved spring spokes; and Fig. 2 is a diametrical section through the wheel.

Referring in detail to the drawing, 5 designates the felly of a wheel upon which the annular treads 6 are secured in any approved manner. The hub 7 of the wheel is provided at one side of its center with an annular flange 8, the periphery of said hub having a plurality of longitudinal slots 9 formed therein terminating at one of their ends against the inner face of said flange. At the bases of said slots the same are provided with undercut grooves 10. The present invention, to be later described, is not restricted in its use to this particular construction of wheel hub or rim, but is simply illustrative of one of the many different forms of wheels to which the invention is applicable. It will therefore be understood that while I refer in the following description to a specific manner of attaching the ends of the resilient plates constituting the spring spokes to the felly and hub of the wheel, such description is given only for the purpose of affording a clear understanding of the function and operation of the invention in actual use.

As above stated, the chief purpose of the invention is to devise a spring spoke for vehicle wheels which will result in a maximum of elasticity in the wheel as a whole. In other words, the object aimed at by prior inventors in this art is to obtain a spoke which will assimilate vertical thrusts directly above and below the axle of the wheel and also at each side thereof, or in a circumferential direction. It will of course be at once appreciated that in order to do this and still secure a spoke which will withstand the great strains to which the same are subjected, load pressure in the direction of the length of the spoke must be eliminated. It is also an essential requirement in the accomplishment of the above stated purpose that a spring of greater length than the radius of the wheel be interposed between the hub and rim thereof. These several features are all successfully taken care of by means of the present invention, which I will now proceed to describe in detail.

Between the hub and felly of the wheel, two circular series of spokes are arranged. Each of these spokes consists of the spring plates 12, the inner ends of which are engaged upon each other and at their extremities are provided with oppositely extending flanges or lugs 13 to be received in the undercut grooves 10 at the bases of the slots 9 in the wheel hub 7. An annular retaining plate 14 is arranged against the edges of the inner ends of said plates and the same retained in position in the slots 9 of the hub. The external diameter of this retaining plate is substantially equivalent to the diameter of the flange 8 on the wheel hub. Fastening bolts 15 are disposed through registering openings in the plate 14 and the flange 8 and provided upon one of their ends with suitable nuts whereby the retaining plate is held in close frictional contact with the inner ends of the spokes. From a point adjacent to the hub of the wheel, the plates 12 constituting each of the spokes, are bent laterally in opposite directions and are slightly inclined outwardly as indicated at 16. The outer ends of the plates 12 are reversely bent and inwardly extended toward each other to form wide open loops 17, the extremities of said plates being fixed to the felly of the wheel by means of the bolts 18.

It will be observed that the inner ends of the spokes in one circular series are fixed to the hub of the wheel at points intermediate of or between the fixed inner ends of the other circular series of spokes, and that the inclined portions 16 of the plates of one spoke intersect the similar portions of the plates of the adjacent spoke of the other circular spoke series. In order to admit of this intersection or passing of the plates of one series with relation to those of the other series, the spokes of the respective series are offset in opposite directions from their inner fixed ends as shown at 19, (see Fig. 2), such offset or angular portions of the plates extending to a slight distance from the outer edges of the flange 8 of the hub and the retaining plate 14. It will be noted that by thus offsetting the spring spokes, the inner edges of the spokes of each series which are opposed to each other are slightly spaced. It will, however, be understood that if desired but one series of the spokes may be provided with offset portions 19. This will be found particularly desirable where the automobile or other vehicle is provided with an extremely large brake drum. In such cases the inside series of spokes will be extended straight from the hub without providing the offset 19, so that said spokes will not interfere with the brake drum.

From the above description and an inspection of the accompanying drawing, it will be readily seen that the force or pressure of the load is applied to the spring plates in a direction at right angles to their length so that there will be little or no end pressure upon the same. The thrust upon the wheel in a direction parallel with its axis is directed against the longitudinal edges of the spokes, and the wheel rim or felly will thus be held against twisting or turning movement when the vehicle rounds a curve, the large number of spokes forming a substantially rigid or unyielding brace between the hub and felly of the wheel under such circumstances. By providing the comparatively lengthy intermediate portions 16 in the plates and the wide looped ends 17 thereof, a very easy running motion is secured and all shocks and jars to the body of the vehicle are absorbed. By means of the peculiar construction and arrangement of the spring spokes as shown, radial thrust upon the wheel in any direction will be taken up in the expansion and compression of the spring plates, without in any way lessening their continued efficiency. By providing the spring spokes of comparatively great length, when the spokes beneath the wheel axle are compressed under the weight of the load, the spokes at the sides and above the axle will readily give or expand, one set of spokes serving to minimize the effect of the compression and expansion of the other series of spokes. It will of course be readily understood, that the size and number of the spring spokes will be regulated in accordance with the weight of the vehicle and the maximum load to be carried thereby.

In the accompanying drawing I have illustrated an embodiment of my invention which at the present time I deem preferable, but it will be obvious that the details of construction may be variously modified within the skill of a mechanic without departing from the spirit of the invention, and it is to be further understood that in carrying out my invention I am not restricted to the particular form or construction of the several elements otherwise than as defined in the appended claim.

Having thus described the invention what is claimed is:

A spring spoke for vehicle wheels comprising a pair of resilient plates having short obliquely disposed portions adjacent one of their ends, said oblique portions of the plates being closely engaged and projecting from the periphery of the wheel hub to which the inner extremities of the plates are secured, said plates being extended laterally from the oblique portions thereof and having their outer ends formed into open loops, the extremities of which are spaced apart and fixed to the wheel felly.

In testimony whereof I hereunto affix my signature in the presence of two witnesses.

WILLIAM T. URIE.

Witnesses:
  E. V. BUCHANAN,
  J. M. REEDER.